(12) United States Patent
Cejka et al.

(10) Patent No.: US 10,018,297 B2
(45) Date of Patent: Jul. 10, 2018

(54) TURN PLATE ASSEMBLY AND TRANSLATION MAT

(71) Applicant: Hunter Engineering Company, St. Louis, MO (US)

(72) Inventors: Brian M. Cejka, Fenton, MO (US); Michael T. Stieff, Wentzville, MO (US)

(73) Assignee: Hunter Engineering Company, St. Louis, MO (US)

( * ) Notice: Subject to any disclaimer, the term of this patent is extended or adjusted under 35 U.S.C. 154(b) by 0 days.

(21) Appl. No.: 15/524,184

(22) PCT Filed: Dec. 15, 2016

(86) PCT No.: PCT/US2016/066908
§ 371 (c)(1),
(2) Date: May 3, 2017

(87) PCT Pub. No.: WO2017/112519
PCT Pub. Date: Jun. 29, 2017

(65) Prior Publication Data
US 2018/0017203 A1    Jan. 18, 2018

Related U.S. Application Data

(60) Provisional application No. 62/270,335, filed on Dec. 21, 2015.

(51) Int. Cl.
*G01B 5/20*       (2006.01)
*B66F 7/28*       (2006.01)
(Continued)

(52) U.S. Cl.
CPC ............... *F16M 7/00* (2013.01); *F16C 19/06* (2013.01); *B66F 7/28* (2013.01); *F16M 2200/08* (2013.01);
(Continued)

(58) Field of Classification Search
CPC ...... B66F 7/28; G01M 17/0074; G01B 5/255; G01B 21/26
(Continued)

(56) References Cited

U.S. PATENT DOCUMENTS 5,782,451 A  *  7/1998  Carnahan ............... A47B 11/00
                                                    248/349.1
6,047,594 A     4/2000  Kroll et al.
(Continued)

FOREIGN PATENT DOCUMENTS

DE     20 2011 102778 U1    9/2011

OTHER PUBLICATIONS

International Search Report corresponding to PCT/US2016/066908, dated Mar. 21, 2017.
(Continued)

*Primary Examiner* — Tan Le
(74) *Attorney, Agent, or Firm* — Sandberg Phoenix & von Gontard PC

(57) ABSTRACT

A turn plate assembly for support of the steered wheels of a vehicle on a precision planar surface. The assembly includes an approach plate establishing a planar surface to within an established measurement tolerance. The approach plate is coupled to a base plate underlying a bearing assembly consisting of a plurality of ball bearings retained between the base plate and an underside of a rotating support disc. An upper surface of the rotating support disc is coplanar with an upper surface of the approach plate. Resting on the upper surface of the rotating support surface, a translational surface or mat is temporarily secured in place by magnetic adhesion. During use, translational forces exerted on the translation surface or mat by a vehicle wheel assembly may
(Continued)

overcome the magnetic adhesion, enabling the translational surface or mat to translate relative to the underlying rotating support disc.

18 Claims, 3 Drawing Sheets

(51) Int. Cl.
*G01B 21/26* (2006.01)
*F16M 7/00* (2006.01)
*F16C 19/06* (2006.01)
*G01B 5/255* (2006.01)
*G01M 17/007* (2006.01)

(52) U.S. Cl.
CPC .............. *G01B 5/255* (2013.01); *G01B 21/26* (2013.01); *G01M 17/0074* (2013.01)

(58) Field of Classification Search
USPC ...... 248/346.03, 349.1, 346.06, 633; 33/203, 33/203.14
See application file for complete search history.

(56) References Cited

U.S. PATENT DOCUMENTS

| | | | |
|---|---|---|---|
| 6,209,209 B1 | 4/2001 | Linson et al. | |
| 7,308,971 B2 | 12/2007 | Liebetreu et al. | |
| 7,472,485 B2* | 1/2009 | Gray | B66F 7/28 187/216 |
| 8,783,638 B2* | 7/2014 | Dantas | G01M 17/0074 187/216 |
| 2003/0138620 A1* | 7/2003 | Fonseca | B32B 7/12 428/317.1 |
| 2004/0013849 A1* | 1/2004 | Kobayashi | A47L 23/266 428/95 |
| 2007/0130784 A1 | 6/2007 | Gray et al. | |
| 2011/0062303 A1* | 3/2011 | Dantas | B66F 7/28 248/346.03 |

OTHER PUBLICATIONS

Written Opinion corresponding to PCT/US2016/066908, dated Mar. 21, 2017.

* cited by examiner

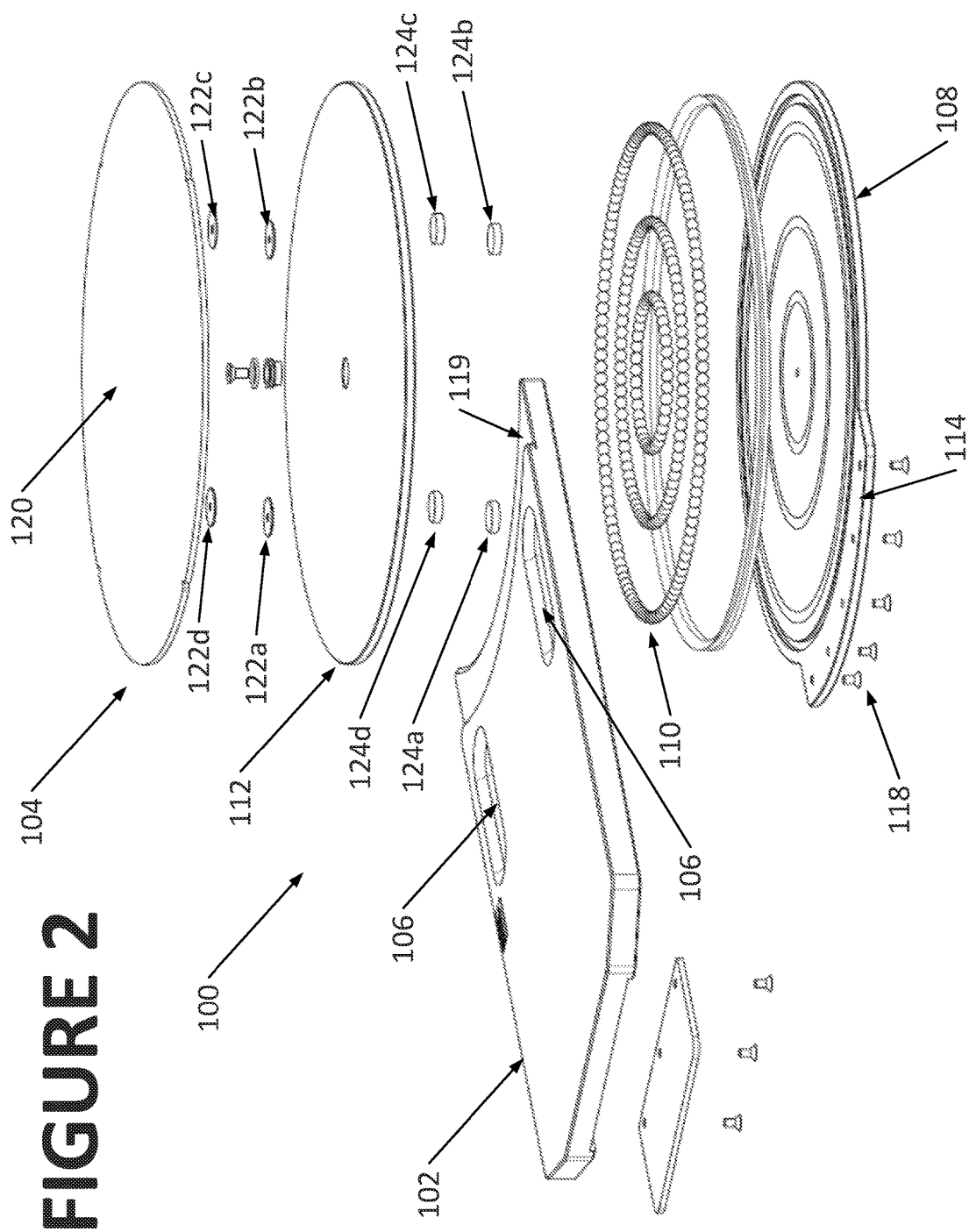

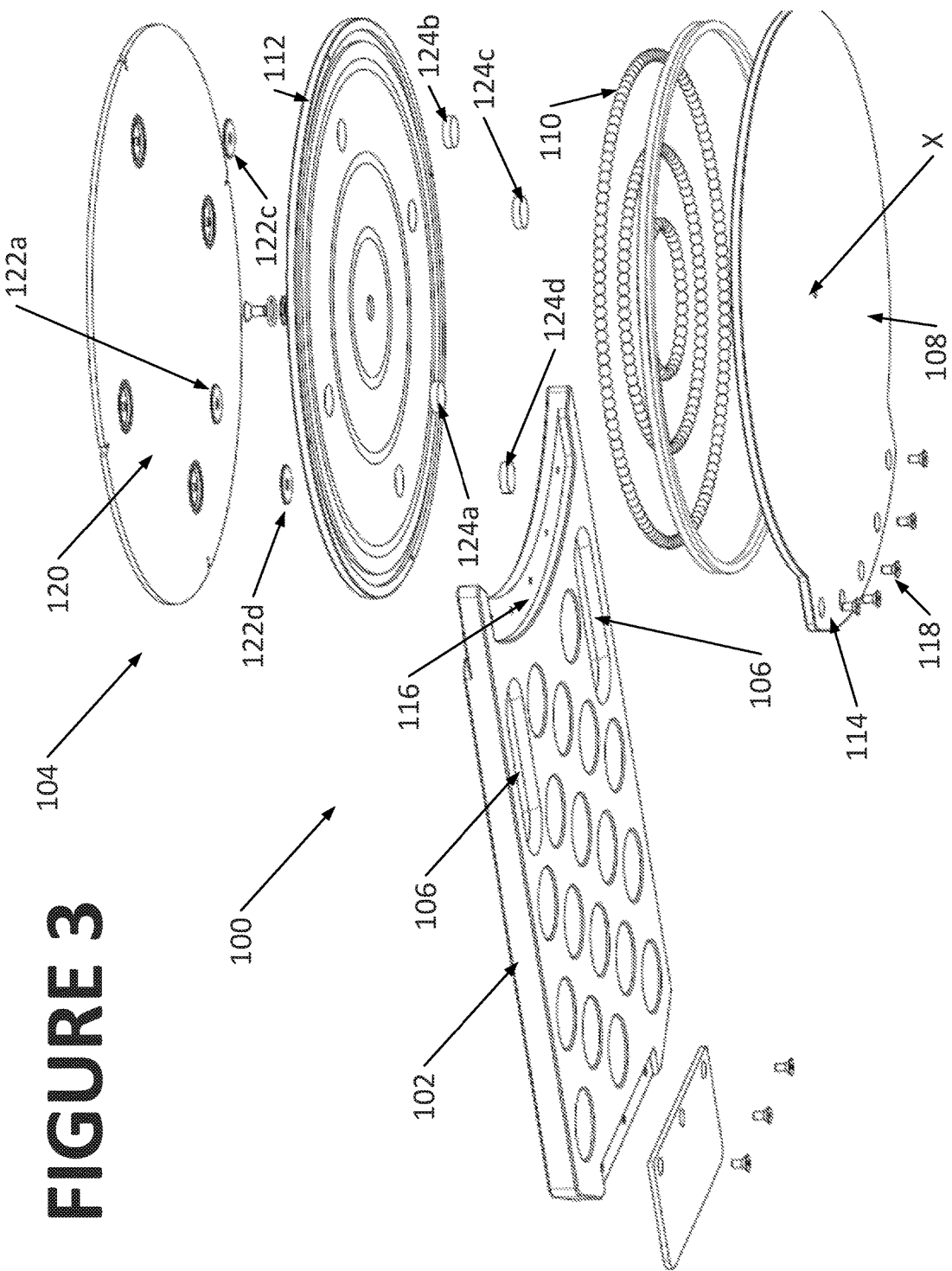

TURN PLATE ASSEMBLY AND TRANSLATION MAT

CROSS-REFERENCE TO RELATED APPLICATIONS

The present application is the US National Stage under 35 USC § 271 et. seq. of International App. No. PCT/US2016/066908, filed on Dec. 15, 2016 and which is related to, and claims priority from, U.S. Provisional Patent Application Ser. No. 62/270,335 filed on Dec. 21, 2015, and both of which are herein incorporated by reference.

STATEMENT REGARDING FEDERALLY SPONSORED RESEARCH

Not Applicable.

BACKGROUND OF THE INVENTION

The present application is related generally to a turn plate assembly providing rotational movement of a supporting surface upon which a vehicle wheel is disposed when a vehicle is parked during a vehicle inspection or service procedure, and in particular, to a low profile and compact turn plate assembly providing a detachable upper surface or mat configured for translational movement relative to an intermediate surface which in turn provides for rotational movement relative to a stationary underlying lower support layer.

Typically, movable surfaces commonly referred to as turn plates are placed on a vehicle support system surface onto which a vehicle undergoing an alignment measurement or adjustment procedure is driven, such as a lift runway or floor surface. The turn plate is commonly a round plate mounted on a bearing surface, separated from, but flush with the surface of the vehicle support system. The turn plate permits the steered wheels of a stationary vehicle to be steered from side to side without requiring lifting of the vehicle, and simultaneously permits limited translational motion within a horizontal plane. These movable surfaces are utilized in order to prevent the vehicle suspension from binding during steering movement of the vehicle as may be required by an alignment adjustment, inspection, or measurement process.

When inspecting, measuring, or adjusting the alignment of heavy duty vehicles, such as multi-axle trucks, often times a vehicle lift or runway is not utilized, and the procedures are done with the vehicle parked on a solid floor surface. For these types of vehicles, turn plate components are either permanently installed in the floor surface or are temporarily placed in-line with the vehicle wheels, such that the vehicle can be driven up onto the turn plates as needed.

During a conventional vehicle wheel alignment procedure, the vehicle is driven onto the turn plates with the movable surfaces in a locked configuration. Next, sensors are mounted to the vehicle wheels, and the sensors compensated before actual vehicle alignment measurements are acquired. The compensation procedures can be performed by rotating the vehicle wheels with the vehicle raised off the runway surface, or alternatively, by rolling the vehicle over a limited range on the runway surface with the wheel alignment sensors attached to the wheels, i.e. "rolling compensation". To carry out the procedure for rolling compensation, it is required that the vehicle be rolled a short distance onto the turn plates, such as shown in U.S. Pat. No. 6,209,209 B1 to Linson et al., which is herein incorporated by reference. Often, temporary devices are used to "bridge" the gaps which are present between the floor surfaces and the edges of each turn plate, permitting the vehicle to roll easier and have some support if the roll procedures carry the vehicle off either the front or rear edges of the turn plate. Following the compensation procedure, the bridges, if present, are removed to avoid interfering with the range of motion of the turn plates. The alignment measurements and any corrective procedures are then carried out in a conventional manner during which the movable surfaces may be locked into a stationary configuration from time to time as required, such as shown in U.S. Pat. No. 7,308,971 to Liebetreu et al., which is herein incorporated by reference.

During the rolling compensation procedures, measurements are acquired which are sensitive to movement of the vehicle suspension. In particular, it has been found that the rolling of the vehicle wheel assembly over a gap between the supporting surfaces and the edge of the turn plates can induce undesired reactions in the vehicle suspension system, and correspondingly, reduce the accuracy of measurements acquired during the rolling compensation procedures. Similar effects have been noted due to physical deflection of the turn plate surfaces away from a horizontal alignment due to an uneven distribution of weight from the vehicle as the vehicle wheels roll towards the respective forward and rear edges of the turn plates.

Accordingly, it would be advantageous to provide turn plate in a configuration which maintains a precision planar surface to within a measurement tolerance as a vehicle is driven across, which reduces undesired reaction in the vehicle suspension system induced due to the presence of voids, gaps, or spaces in the vehicle's travel path, which allows for both translational and rotational movement of a vehicle wheel, and which is sufficiently light weight for portable movement between temporary use locations on floor surfaces.

BRIEF SUMMARY OF THE INVENTION

Briefly stated, the present disclosure sets forth a turn plate assembly for support of the steered wheels of a vehicle on a precision planar surface. The assembly includes an approach plate establishing a planar surface to within an established measurement tolerance. The approach plate is coupled to a base plate underlying a bearing assembly consisting of a plurality of ball bearings retained between the base plate and an underside of a rotating support disc. An upper surface of the rotating support disc is coplanar with a recessed edge of an upper surface of the approach plate. Resting on the upper surface of the rotating support surface, substantially coplanar with the upper surface of the approach plate, a translational surface or mat is temporarily secured in place by magnetic adhesion. During use, translational forces exerted on the translation surface or mat by a vehicle wheel assembly may overcome the magnetic adhesion, enabling the translational surface or mat to translate relative to the underlying rotating support disc, and to partially overlap the recessed edge of the approach plate.

In a further embodiment, the translation surface or mat is a consumable component of the turn plate assembly, and is replaced if worn or damaged.

In a further embodiment, the approach plate includes a pair of handles to facilitate handling and movement of the turn plate assembly.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 2 is an exploded view of the heavy duty turn plate assembly and translational mat of FIG. 1, see from above; and FIG. 3 is an exploded view of the heavy duty turn plate assembly and translational mat of FIG. 1, see from below.

Corresponding reference numerals indicate corresponding parts throughout the several figures of the drawings. It is to be understood that the drawings are for illustrating the concepts set forth in the present disclosure and are not to scale.

Figure 1:
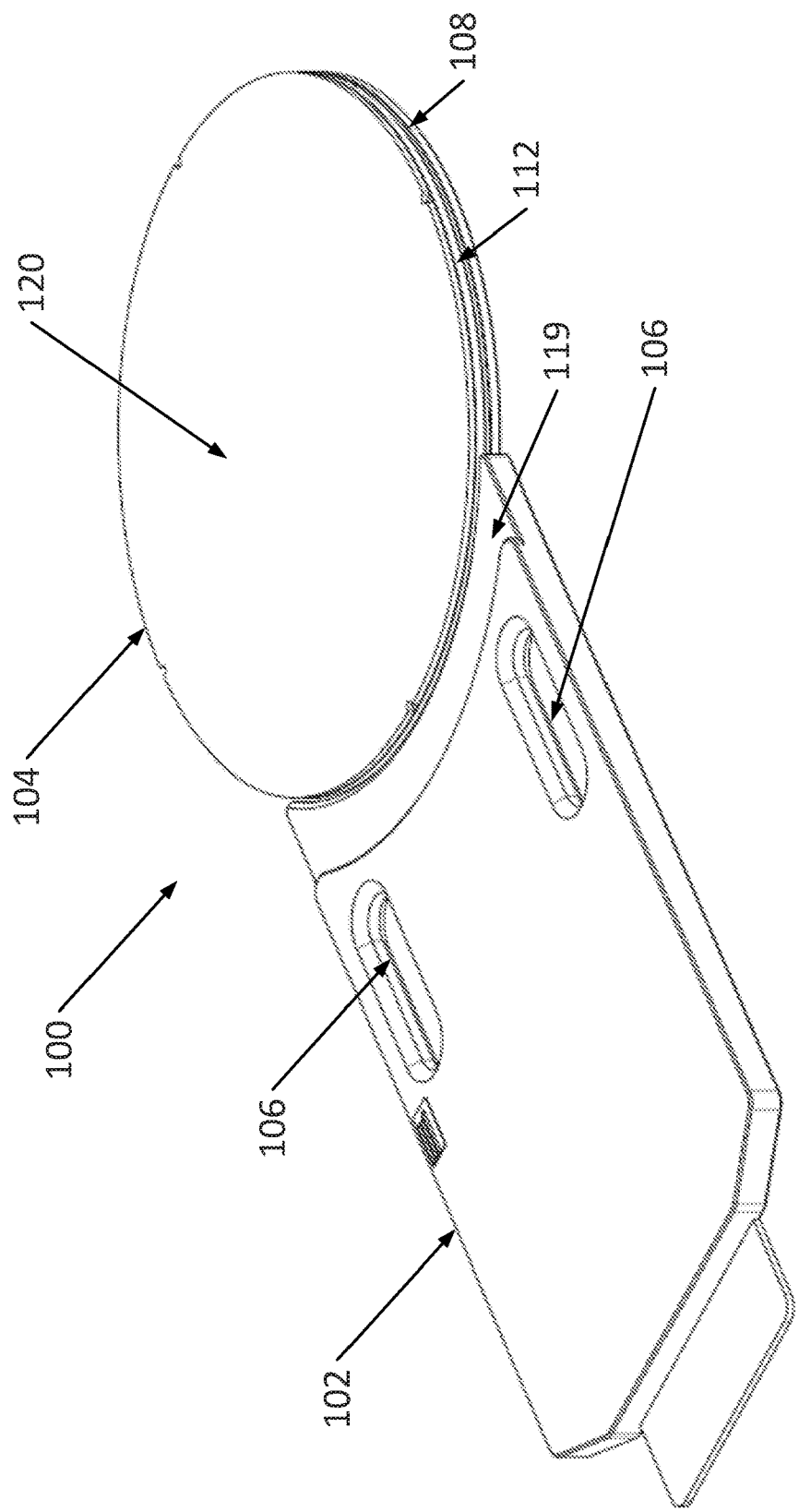
FIG. 1 is a top perspective view of a heavy duty turn plate assembly and translational mat of the present disclosure.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Turning to the Figures, and to FIG. 1 first, a turn plate assembly of the present disclosure is shown generally at 100. The turn plate assembly 100 is designed with the understanding that it can be transported to various vehicle service locations as needed without disassembly or detachment from any underlying structures. The turn plate assembly 100 includes an approach plate 102, providing a flat and uniform surface over which a vehicle approaching a rotating component assembly 104 can drive, thereby minimizing the effects of suspension bounce or jostle caused by transitioning over excessively uneven surfaces or gaps. Preferably, the approach plate is a rigid unitary body, such as a plate of thick steel which is flat to within a desired tolerance, and which incorporates one or more handles 106 to facilitate transport of the turn plate assembly 100 as needed.

The rotating component assembly 104 is secured to a longitudinal end of the approach plate 102, and consists of a base plate 108, a bearing assembly 110 supported on the base plate, and a rotating support disc 112 supported on the bearing assembly for rotation about a fixed vertical axis X. To secure the rotating component assembly 104 to the approach plate 102, a peripheral tab 114 extends from the base plate 108, and seats within a matching recess 116 on the underside of the approach plate. A set of bolts 118 or other suitable fasteners are employed to rigidly couple the base plate to the approach plate via the peripheral tab 114 and matching recess 116.

The bearing assembly 110 is disposed on an upper surface of the base plate 108, supporting the rotating support disc 112 for rotation about the fixed axis X. Those of ordinary skill in the art will recognize that the bearing assembly 110 may consist of a variety of rolling elements, such as roller bearings, ball bearings, needle bearings, and associated retaining cages or structures without departing from the scope of the present disclosure. As seen in FIGS. 2 and 3, the bearing assembly 110 is shown to consist of a plurality of ball bearings rolling within a plurality of annular and concentric grooves or channels in the upper surface of the base plate and lower surface of the rotating support plate. Essentially, the bearing assembly 110 permits the rotating support disc 112 to rotate freely about the rotational axis X in response to rotational forces applied to the upper surface.

When a vehicle is driven onto the turn plate assembly 100, and a wheel assembly comes to rest on the rotating component assembly 104, steering movement of the wheel assembly will exert a rotational force and a translational force on the supporting surfaces due to the design of the vehicle suspension geometry. Since the rotating support disc 112 is secured against any translational movement, and only configured to provide rotational movement about the fixed axis X, a translational mat 120 is releasably secured to the upper surface of said rotating support disc 112. The vertical dimensions of the base plate, bearing assembly, rotating support disc 112, and translational mat 120 are selected such that an upper surface of the translational mat 120 is substantially coplanar with the upper surface of the approach plate 102. The translational mat, upon which the vehicle wheel assembly actually rests, is configured with freedom for translational movement relative to said rotating support disc 112 in response to an applied translational force such as during steering of the wheel assembly. The approach plate 102 includes a recessed region 119 of the upper surface adjacent to the rotating support disc 112, into which the translation mat 120 may move without interference during translational movement.

Preferably, magnetic adhesion is utilized to releasably secure the translational mat 120 to the upper surface of the rotating support disc 112. As seen in FIGS. 2 and 3, a first set of magnetic elements, such as magnets or ferrous metal discs 122a-d are disposed within said translational mat 120, and a second set of magnetic elements 124a-d are disposed within said rotating support disc 112. The first and second sets of magnetic elements (magnets and ferrous metal discs) are aligned to exert a magnetic attraction when the translational mat 120 is coaxially positioned on the rotating support disc 112, in at least one relative rotational position about the fixed rotational axis X. Those of ordinary skill will recognize that the function of the sets of magnetic elements is merely to retain the translational mat 120 in place when it is not subject to translational forces from a vehicle wheel assembly, and as such, any of a variety of configuration of magnetic elements may be utilized. Alternative means of temporary adhesion, such as high friction surfaces, Velcro-type surfaces, etc. may be utilized if they provide the requisite degree of adhesion forces and have sufficient durability to withstand repeated coupling and uncoupling.

The translation mat 120 is intended to be a semi-consumable component of the turn plate assembly, and as such, preferably comprises a thick disc of polyethylene material, such as ultra-high-molecular-weight polyethylene. The translation mat 120 is preferably resiliently flexible in order to accommodate deformations which may result from a translational movement off an adjacent edge of the underlying rotating support disc while under load from a vehicle wheel assembly. If the translation mat 120 becomes damaged, degraded, or worn, it may simply be discarded and replaced with a new translation mat without requiring any disassembly of the turn plate 100.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A turn plate assembly, comprising:
a base plate;
an approach plate, with said base plate coupled to a longitudinal end of said approach plate;
a bearing assembly supported on said base plate, said bearing assembly including a plurality of rolling elements;
a rotating support disc supported on said bearing assembly for rotation movement about a fixed axis;
a translational mat releasably secured to the upper surface of said rotating support disc, said translational mat having freedom for translational movement relative to said support disc in response to an applied translational force; and
wherein said base plate includes a peripheral tab, said peripheral tab is seated within a matching recess within an underside surface of said approach plate.

2. The turn plate assembly of claim 1 wherein said peripheral tab is coupled to said approach plate by a plurality of bolts.

3. A turn plate assembly, comprising:
a base plate;
a bearing assembly supported on said base plate, said bearing assembly including a plurality of rolling elements;
a rotating support disc supported on said bearing assembly for rotation movement about a fixed axis;
a translational mat releasably secured to the upper surface of said rotating support disc, said translational mat having freedom for translational movement relative to said support disc in response to an applied translational force; and
wherein said translational mat is releasably secured to the upper surface of said rotating support disc by magnetic adhesion.

4. The turn plate assembly of claim 3 further including an approach plate, with said base plate coupled to a longitudinal end of said approach plate.

5. The turn plate assembly of claim 4 wherein said approach plate includes at least one handle to facilitate transport of the turn plate assembly.

6. The turn plate assembly of claim 4 wherein an upper surface of said translational mat is coplanar with an upper surface of said approach plate.

7. The turn plate assembly of claim 4 wherein said approach plate is a unitary body, where said upper surface of said approach plate is flat to within a defined tolerance, and wherein said upper surface of said approach plate further includes a recessed region adjacent to said translational mat.

8. The turn plate assembly of claim 3 wherein said base plate includes a plurality of concentric annular channels, and wherein said plurality of rolling elements are disposed to roll within said concentric annular channels.

9. The turn plate assembly of claim 3 wherein said plurality of rolling elements are ball bearings.

10. The turn plate assembly of claim 3 further including a cage assembly configured to retain said rolling elements in a spaced arrangement between said base plate and said rotating support disc.

11. The turn plate assembly of claim 3 further including one or more magnetic elements disposed within said translational mat, and one or more magnetic elements disposed within said rotating support disc, said magnetic elements within said translational mat and said rotating support disc aligned to cooperatively exert a magnetic attraction therebetween when said translational mat is disposed on said rotating support disc in a first position.

12. The turn plate assembly of claim 11 wherein said translational mat in said first position is coaxially aligned with said rotating support disc and is rotationally oriented at a predetermined relative rotational to said rotating support disc.

13. The turn plate assembly of claim 3 wherein said translational mat is composed of polyethylene.

14. The turn plate assembly of claim 3 wherein said translational mat is resiliently flexible.

15. A method for using a turn plate assembly of claim 3 to relieve translational forces exerted between a vehicle wheel assembly and a supporting surface during steering movement, comprising:
positioning the vehicle wheel assembly on a translational mat of the turn plate assembly of claim 3 while said translational mat is positioned on an upper surface of a rotating support disc;
exerting a steering force on said vehicle wheel assembly, said steering force having a rotational component and a translational component;
responsive to said rotational component of said steering force, rotating the rotating support disc about said rotational axis; and
responsive to said translational component of said steering force exceeding a limit, translating said translational mat across said upper surface of said rotating support disc.

16. A turn plate assembly comprising:
a base plate;
a bearing assembly supported on said base plate, said bearing assembly including a plurality of rolling elements disposed within a plane between said base plate and a rotating support disc having an upper surface to enable rotation of said rotating support disc about a fixed axis perpendicular to said plane;
a translational mat positioned on said upper surface for supporting a steered wheel of a vehicle, said translational mat composed of a resiliently flexible sheet having peripheral dimensions substantially identical to said upper surface together with an attachment means for temporary magnetic adhesion of said resiliently flexible sheet to said upper surface; and
wherein said attachment means is configured to provide said resiliently flexible sheet with freedom for translational movement across said bearing assembly upper surface in response to an applied translational force.

17. The turn plate assembly of claim 16 wherein said attachment means includes a set of discrete magnetic elements disposed within said resiliently flexible sheet.

18. The turn plate assembly of claim 16 wherein said resiliently flexible sheet is composed of polyethylene.

* * * * *